United States Patent [19]

Smalley et al.

[11] Patent Number: 4,653,765
[45] Date of Patent: Mar. 31, 1987

[54] DRUM TRUCK

[75] Inventors: Robert L. Smalley, Gaffney; John E. Phifer, Spartanburg, both of S.C.

[73] Assignee: Milliken Research Corporation, Spartanburg, S.C.

[21] Appl. No.: 803,551

[22] Filed: Dec. 2, 1985

[51] Int. Cl.⁴ .............................................. B62B 1/08
[52] U.S. Cl. ................. 280/47.2; 280/47.21; 280/47.27
[58] Field of Search ............... 280/47.2, 47.12, 47.21, 280/47.22, 47.27, 47.24

[56] References Cited

U.S. PATENT DOCUMENTS

| | | | |
|---|---|---|---|
| 1,136,954 | 4/1915 | Gunning | 280/47.2 |
| 1,308,934 | 7/1919 | Chesnutt | 280/47.2 |
| 1,725,095 | 8/1929 | Morrow | 280/47.12 |
| 2,096,994 | 10/1937 | Millen | 280/47.21 |
| 2,485,085 | 10/1949 | Burch | 280/47.12 |
| 4,226,434 | 10/1980 | Hill | 280/47.21 |

FOREIGN PATENT DOCUMENTS 91884  8/1959  Netherlands ............... 280/47.12

Primary Examiner—David M. Mitchell
Attorney, Agent, or Firm—Earle R. Marden; H. William Petry

[57] ABSTRACT

A drum truck which has additional wheels to support the load on the truck as the load is being transported from one place to another. Additionally, the drum truck provides a mechanism to lock the load to the truck and a support providing a bearing surface for the support structure of the truck when in the load bearing position.

2 Claims, 6 Drawing Figures

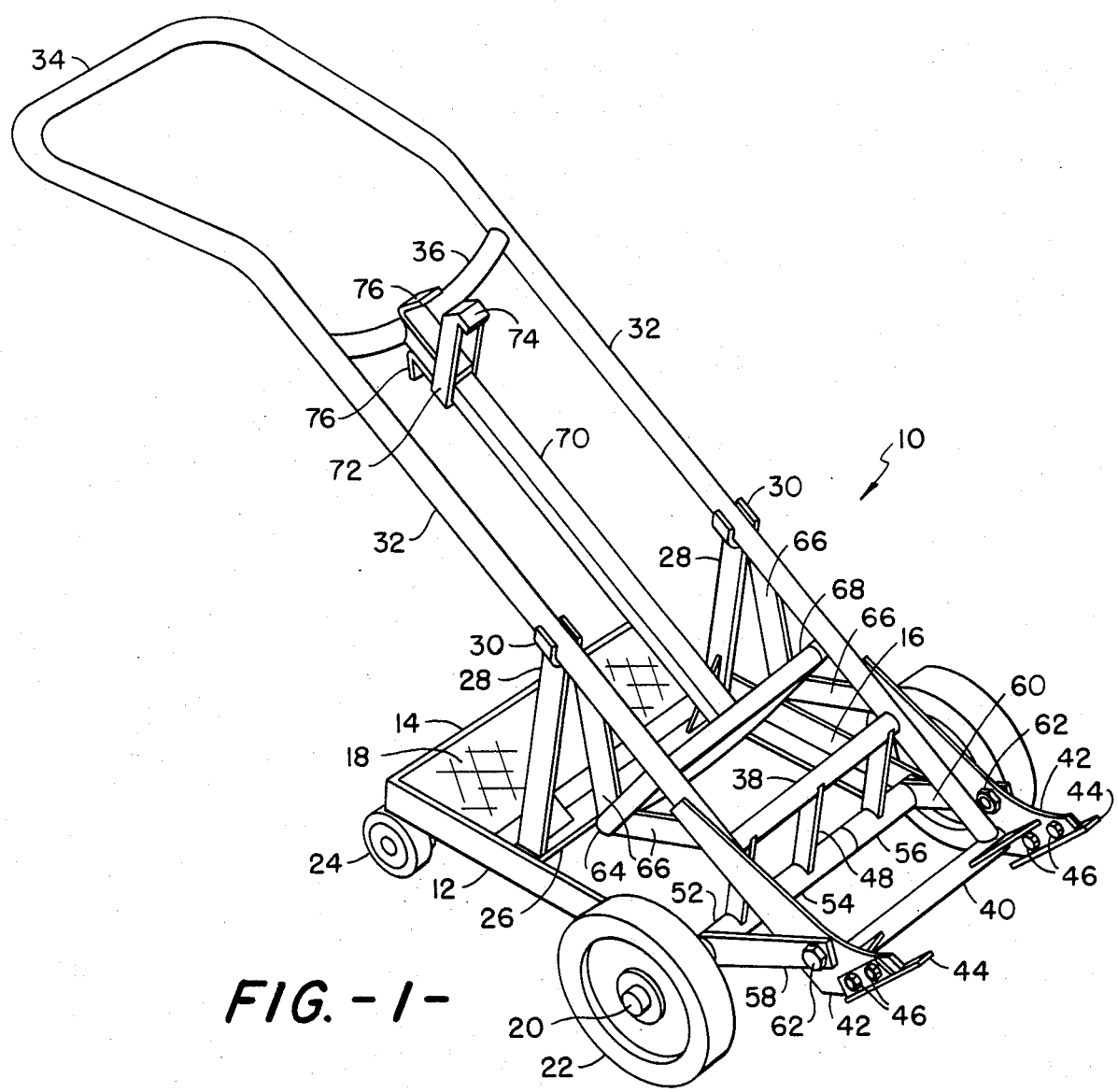
FIG.-1-
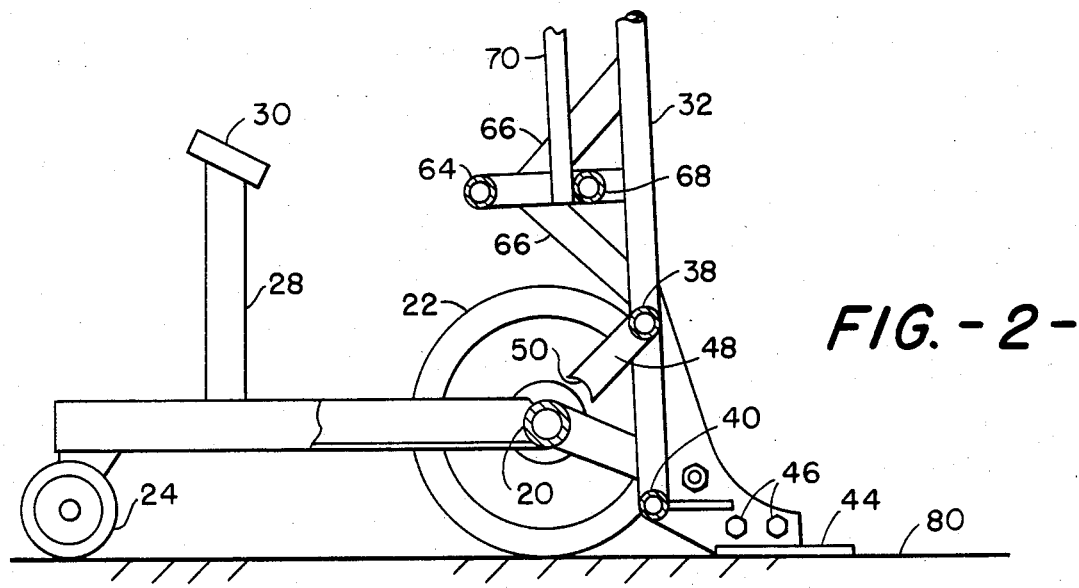
FIG.-2-

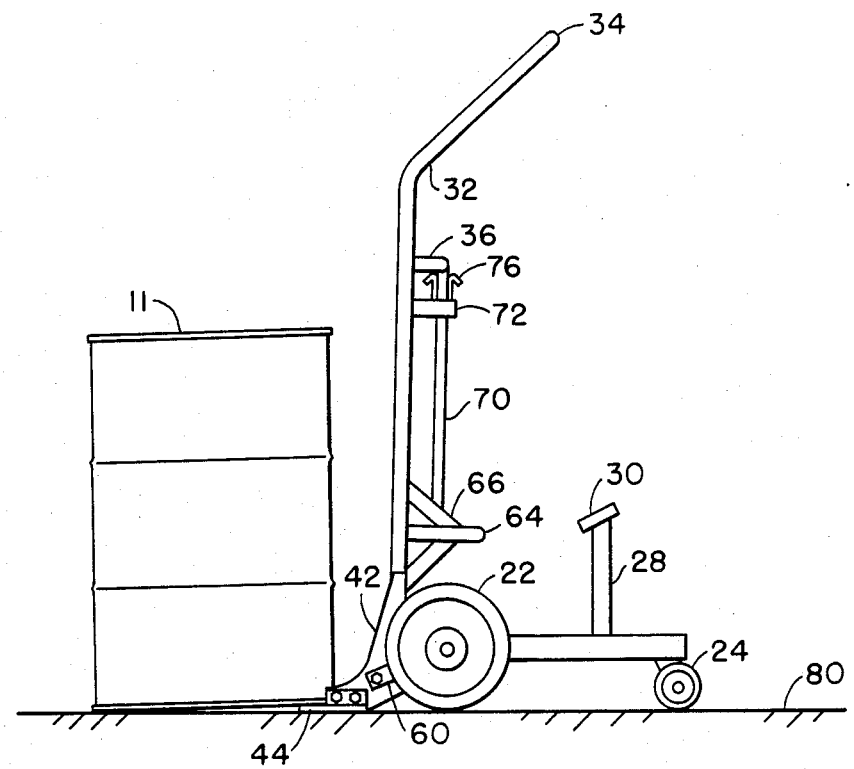
FIG. -3-
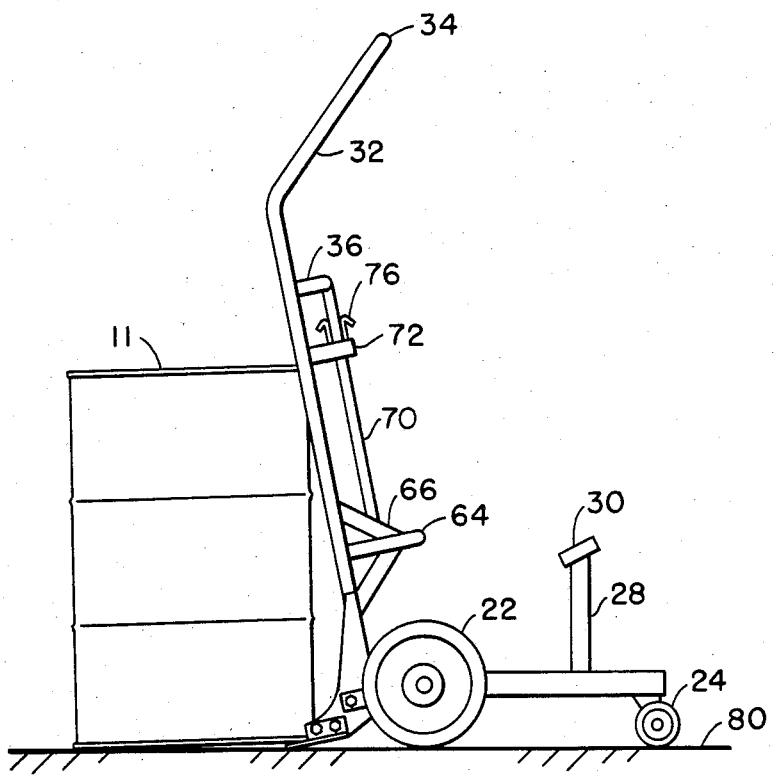
FIG. -4-

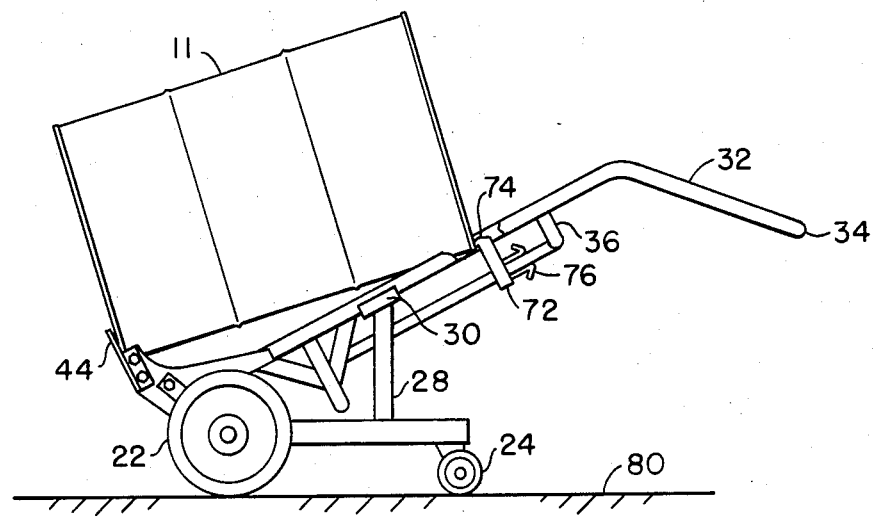
FIG. -5-
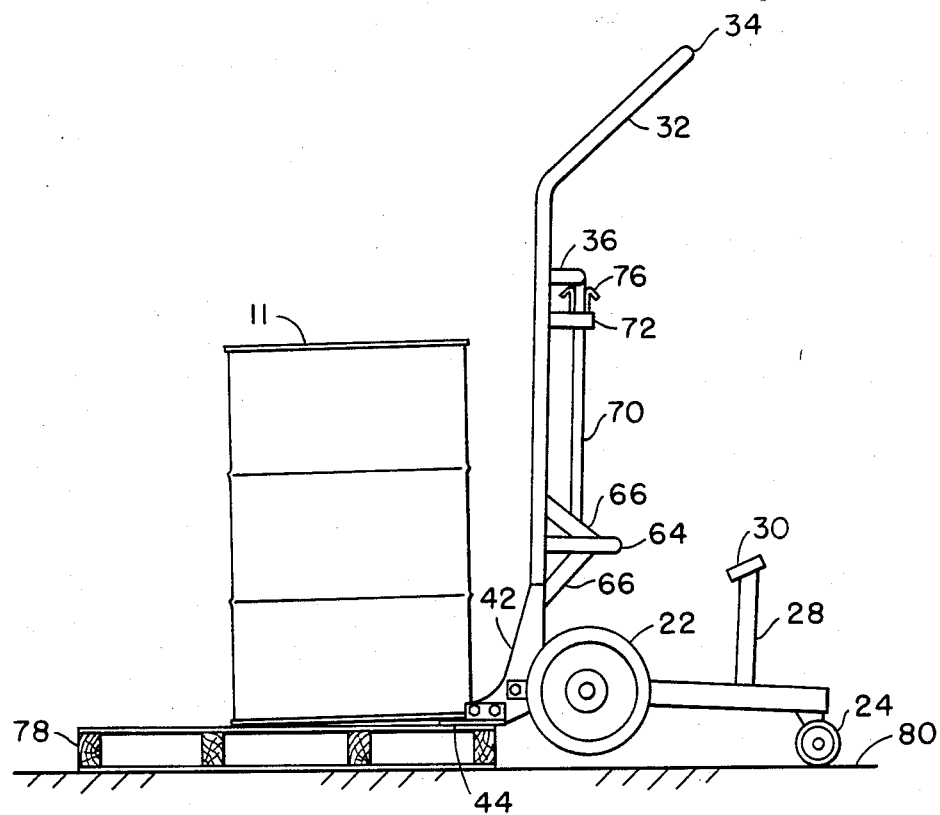
FIG. -6-

DRUM TRUCK

This invention generally relates to material handling devices and more particularly to devices which will easily and safely handle large drums of material without undue strain on the operator.

It is an object of the invention to provide a new and improved drum truck which allows easy and safe transportation of heavy drums from one place to another.

Other objects and advantages of the invention will become readily apparent as the specification proceeds to describe the invention with reference to the accompanying drawings, in which:

FIG. 1 is a perspective view of the new and improved drum truck;

FIG. 2 is a partial side view of the drum truck shown in FIG. 1;

FIG. 3 shows the drum truck as it initially engages a drum to be transported;

FIG. 4 is a view similar to FIG. 3 showing the drum about to be loaded;

FIG. 5 is a view similar to FIGS. 3 and 4 showing the drum in its transported position, and FIG. 6 is a view similar to FIG. 3 showing the drum truck in position to a drum located on a skid.

Prior to the invention, drum trucks were of the type that required the drum to be transported to be located on a flat surface to which the truck could be rolled up to. Furthermore, the drum, if on a skid, had to be physically rolled into the desired position by an operator. The drum, once it was engaged by the truck, had to be broken over by the operator onto the truck and the operator had to support the load as the drum was moved from place to place. This was not only physically burdensome to the operator, but was unsafe because of possible accidents as well as physical harm to the operator.

The drum truck shown in FIGS. 1 and 2, generally designated by reference numeral 10, was invented to eliminate the above enumerated problems and hazards. The drum truck 10 to transport the drum 11 is basically supported by a frame consisting of three L-shaped frame members 12, 14 and 16 having a metal member 18 connected thereto to form a step and a shaft so projecting through the members 12 and 16 to support the wheels 22. Suitably connected below the step 18 are a pair of rear wheels 24 for reasons hereinafter explained. Extending between and attached to the inside of the support members 12 and 16 is a rectangular plate member 26 which supports the upstanding members 28. Connected to the top of the upstanding members 28 are semi-circular members 30 to support the tubular members 32 of the load bearing mechanism as shown in FIGS. 1 and 5.

The load bearing mechanism of the drum truck consists of the spaced apart tubular members 32, the handle portion 34 connected between the members 32, the circular support member 36, tubular support member 38, tubular support member 40, elongated lifting prong support members 42 attached to the outside of the tubular member 32 and the tubular member 40 and lifting prongs 44 held by screws, bolts 46 or other suitable means to the support members 42.

Mounted to the tubular support member 38 are a plurality of bearing plates 48 which in the position shown in FIGS. 1 and 5 have a concave surface 50 bearing on the sleeve members 52, 54 and 56 which are telescoped over the shaft 20. The sleeve members 52 and 56 are rigidly secured, respectively to one end of the lever arms 58 and 60 while the sleeve member 54 is merely a spacer. The other end of the lever arms 58 and 60 are secured to the lifting prong support members 42 by suitable means such as the bolt and screw arrangement 62.

To provide additional support for the drum truck 10 a U-shaped tubular member 64 is welded or otherwise secured to the members 32 and has truss supports 66 connected thereto. Additionally, a tubular bar member 68 extends between and is attached adjacent the end of the U-shaped member 64. Welded or otherwise secured to the bottom side of the bar member 68 is a rectangular rod 70 which extends upwardly and is connected to the circular member 36. Slidably mounted on the rod 70 is a clamping member 72 which has an upstanding flange 74 to engage the lip of a drum and flanges 76 for engagement by an operator to slide the clamping member 72 up and down on the rod member 70.

In operation, the drum truck 10 is moved across the floor to a position as shown in FIG. 3 with the lifting prong 44 under the drum 11 and the tubular members 32 in the upright position. Then, the tubular members 32 are pivoted toward the drum 11 to be transported and the clamping member 72 slid downwardly until the flange 74 engages and receives the lip of the drum as shown in FIG. 4. Then the operator places a foot on the step 18 and pivots the handle 34, along with the drum to the position shown in FIG. 5 where the tubular members 32 are supported in the semi-circular members 30 and the weight of the drum is distributed throughout the truck since the rear wheels 24 are on the floor 80. Then the operator can move the drum 11 to the desired position on the wheels 22 and 24 without extreme exertion.

An important feature of the drum truck 11 is illustrated in FIG. 6 in that the design allows the drum truck to engage a drum 11 on a pallet 78 without physically having to wrestle the drum off the pallet or skid 78 prior to pick up. It should be noted that the wheels 24 provide stability for the truck 10 to allow the pick-up of the drum.

The herein described drum truck has numerous advantages. One of the biggest is the ability to raise the truck to a position where it can load and unload drums on and from a pallet or skid without excessive manual movement of the drum. Other advantages include the ability to lift heavier drums due to improved leverage and better stability due to additional wheels which distribute the weight. Another very important advantage is that one man or operator can handle a heavy drum of material with ease without the operator having to carry the weight since the drum truck is on the floor.

Although the preferred embodiment of this invention has been described specifically, it is contemplated that many changes may be made without departing from the scope or spirit of the invention and it is desired that the invention be limited only by the claims.

We claim:

1. A drum truck for transportation of materials in a drum comprising: a frame, wheels mounted on the front and rear portions of said frame, lifting prongs pivotally secured to the front portion of said frame, load carrying members extending beyond the rear portion of said frame and being connected to said lifting prongs and pivoting therewith, means operably associated with load carrying members to grasp the lip of a drum when the drum is engaged by said lifting prongs and means connected to said frame supporting the weight of said load carrying members and a drum when a drum of material has been loaded on the drum truck, said load carrying members including a pair of spaced apart first rod members and said means supporting the weight of said members and the drum includes semi-circular members connected to said frame and projecting upwardly therefrom and engaging said first rod members when said first rod members are pivoted to the load carrying position, said means supporting the weight of said load carrying members further including a support member extending between and attached to second rod members adjacent the front portion of said frame, said wheels adjacent said front portion being at least two in number and spaced apart on a common shaft, said support member having means engaging said shaft when said second rod members are pivoted to the load bearing position, said means engaging said shaft including collar members telescoped over said shaft and arms connected to said support member at one end and having concave surfaces at the other end engaging said collars when said second rod members are pivoted to the load bearing position.

2. A drum truck for transportation of materials in a drum comprising: a frame, wheels mounted on the front and rear portions of said frame, lifting prongs pivotally secured to the front portion of said frame, load carrying members extending beyond the rear portion of said frame and being connected to said lifting prongs and pivoting therewith, means operably associated with load carrying members to grasp the lip of a drum when the drum is engaged by said lifting prongs and means connected to said frame supporting the weight of said load carrying members and a drum when a drum of material has been loaded on the drum truck, said frame being elongated and having a platform at the rear thereof over the wheels on the rear portion to provide foot space for an operator loading a drum onto the drum truck, said load carrying members including a pair of spaced apart first rod members and said means supporting the weight of said members and the drum includes semi-circular members connected to said frame and projecting upwardly therefrom and engaging said first rod members when said first rod members are pivoted to the load carrying position, said means supporting the weight of said load carrying members further includes a support member extending between and attached to second rod members adjacent the front portion of said frame, said wheels adjacent said front portion being at least two in number and spaced apart on a common shaft, said support member having means engaging said shaft when said second rod members are pivoted to the load bearing position, said means engaging said shaft including collar members telescoped over said shaft and arms connected to said support member at one end and having concave surfaces at the other end engaging said collars when said second rod members are pivoted to the load bearing position.

* * * * *